United States Patent
Sly et al.

(10) Patent No.: US 11,169,173 B2
(45) Date of Patent: Nov. 9, 2021

(54) AIR DATA SYSTEM ARCHITECTURES INCLUDING LASER AIR DATA AND ACOUSTIC AIR DATA SENSORS

(71) Applicant: Rosemount Aerospace Inc., Burnsville, MN (US)

(72) Inventors: Jaime Sly, Savage, MN (US); Mark Sherwood Miller, Lakeville, MN (US)

(73) Assignee: Rosemount Aerospace Inc., Roseville, MN (US)

( * ) Notice: Subject to any disclaimer, the term of this patent is extended or adjusted under 35 U.S.C. 154(b) by 267 days.

(21) Appl. No.: 16/413,077

(22) Filed: May 15, 2019

(65) Prior Publication Data
US 2020/0363445 A1  Nov. 19, 2020

(51) Int. Cl.
| | | |
|---|---|---|
| G01P 5/26 | (2006.01) | |
| G01C 5/06 | (2006.01) | |
| G01C 23/00 | (2006.01) | |
| G01P 5/24 | (2006.01) | |

(52) U.S. Cl.
CPC .................. *G01P 5/26* (2013.01); *G01C 5/06* (2013.01); *G01C 23/00* (2013.01); *G01P 5/24* (2013.01)

(58) Field of Classification Search
None
See application file for complete search history.

(56) References Cited

U.S. PATENT DOCUMENTS

| | | |
|---|---|---|
| 7,155,969 B2 | 1/2007 | Drutowski et al. |
| 8,434,358 B2 | 5/2013 | Asahara et al. |
| 9,121,860 B1 | 9/2015 | Cronyn |
| 9,415,881 B2 | 8/2016 | Certain et al. |
| 10,101,443 B1* | 10/2018 | LeGrand, III ............ G05D 3/00 |
| 2004/0252586 A1* | 12/2004 | Martin ................... G01S 15/885 367/89 |
| 2007/0109528 A1 | 5/2007 | Caldwell et al. |
| 2009/0310118 A1* | 12/2009 | Halldorsson ............. G01P 5/26 356/28 |
| 2010/0152933 A1 | 6/2010 | Smoot et al. |
| 2013/0166113 A1* | 6/2013 | Dakin .................... G01S 7/4818 701/10 |
| 2017/0248700 A1 | 8/2017 | Lodden et al. |
| 2017/0267371 A1* | 9/2017 | Frolov ....................... G01F 1/68 |
| 2017/0276790 A1* | 9/2017 | Lodden ..................... G01P 5/26 |
| 2018/0172720 A1 | 6/2018 | Miller et al. |
| 2019/0302141 A1* | 10/2019 | Caldwell ................... G01P 5/26 |

FOREIGN PATENT DOCUMENTS

JP    H09249198 A    9/1997

OTHER PUBLICATIONS

Extended European Search Report for European Application No. 19214726, dated Jul. 3, 2020, nine pages.

* cited by examiner

*Primary Examiner* — Andre J Allen
*Assistant Examiner* — Jermaine L Jenkins
(74) *Attorney, Agent, or Firm* — Kinney & Lange, P.A.

(57) ABSTRACT

A system includes a laser air data sensor and an acoustic air data sensor. The laser air data sensor is configured to emit directional light into airflow about an aircraft exterior and to generate first air data parameter outputs for the aircraft based on returns of the emitted directional light. The acoustic air data sensor is configured to emit acoustic signals into the airflow about the aircraft exterior, sense the acoustic signals, and generate second air data parameter outputs for the aircraft based on the sensed acoustic signals.

20 Claims, 6 Drawing Sheets

Fig. 6 ically isolated sensor to generate independent sets of -->

AIR DATA SYSTEM ARCHITECTURES INCLUDING LASER AIR DATA AND ACOUSTIC AIR DATA SENSORS

BACKGROUND

The present disclosure relates generally to air data systems, and more particularly to air data systems utilizing laser air data sensors and acoustic air data sensors for generating aircraft air data parameter outputs.

Modern aircraft often incorporate air data systems that calculate air data outputs based on measured parameters collected from various sensors positioned about the aircraft. For instance, many air data systems utilize air data probes that measure pneumatic pressure of airflow about the aircraft exterior to generate aircraft air data outputs, such as angle of attack (i.e., an angle between the oncoming airflow or relative wind and a reference line of the aircraft, such as a chord of a wing of the aircraft), calibrated airspeed, Mach number, altitude, or other air data parameters. During sideslip of the aircraft (i.e., a nonzero angle between the direction of travel of the aircraft and the aircraft centerline extending through the nose of the aircraft), compensation of various local (to the probe) parameters or signals, such as angle of attack and static pressure, is advantageous for accurate determination of aircraft air data parameters, such as aircraft angle of attack or aircraft pressure altitude (determined from static pressure measurements). The air data probes may also be paired with temperature sensors in order to determine static air temperature, total air temperature, and true airspeed.

Increased accuracy achieved through sideslip compensation is particularly relevant in modern aircraft employing advanced control mechanisms that operate in the National Airspace System, as well as to accommodate fly-by-wire or other control systems that may benefit from increased accuracy achieved through sideslip compensation. To this end, many air data systems utilize multiple pneumatic air data probes positioned at opposite sides of the aircraft and cross-coupled to exchange pressure information. Static pressure sensed by an opposite side probe is used to compensate air data parameter outputs for a sideslip condition. In certain air data systems, cross-coupled probes are pneumatically connected so that the pressure signals are averaged between probes.

As aircraft systems such as flight control systems and stall protection systems become more highly integrated, complex, and automated, the integrity of air data information used by these aircraft systems becomes increasingly important. Air data sensors such as a pitot-static probes, angle of attack vanes, total air temperature (TAT) probes, and other air data sensors that extend into the airflow about the exterior of the aircraft can be susceptible to icing conditions as water vapor in the airflow impinges on the exposed sensor, thereby requiring anti-icing (e.g., heater) components and the electrical power budget associated therewith. Moreover, such sensors that extend into the oncoming airflow can increase drag on the aircraft, thereby reducing efficiency of flight.

SUMMARY

In one example, a system includes a first laser air data sensor and an acoustic air data sensor. The first laser air data sensor is configured to emit first directional light into airflow about an aircraft exterior and to generate first air data parameter outputs for the aircraft based on returns of the emitted first directional light. The acoustic air data sensor is configured to emit acoustic signals into the airflow about the aircraft exterior, sense the acoustic signals, and generate second air data parameter outputs for the aircraft based on the sensed acoustic signals.

In another example, a method includes emitting, by a first laser air data sensor disposed on an aircraft, first directional light into airflow about an exterior of the aircraft, receiving, by the first laser air data sensor, returns of the emitted first directional light, and generating, by the first laser air data sensor, first air data parameter outputs for the aircraft based on the returns of the emitted first directional light. The method further includes emitting, by an acoustic transmitter of an acoustic air data sensor disposed on the aircraft, acoustic signals into the airflow about the exterior of the aircraft, sensing, by a plurality of acoustic receivers of the acoustic air data sensor, the acoustic signals transmitted by the acoustic transmitter, and generating, by the acoustic air data sensor, second air data parameter outputs for the aircraft based on a time of flight of the acoustic signals from the acoustic transmitter to the plurality of acoustic receivers.

DETAILED DESCRIPTION

As described herein, example air data system architectures include low-profile (e.g., flush with the aircraft skin) sensors that provide multiple (e.g., two, three, or more) independent sets of air data parameter outputs for use by consuming aircraft systems, such as automatic flight control systems, flight management systems, avionics systems, cabin pressurization and/or air management systems, or other consuming systems. The example architectures utilize combinations of laser air data sensors and acoustic air data sensors to provide air data parameter outputs, such as aircraft altitude, airspeed (e.g., true airspeed and/or calibrated airspeed), angle of attack, angle of sideslip, Mach number, or other air data parameter outputs that are derived from dissimilar technologies (i.e., optical and acoustic technologies) having dissimilar failure modes, thereby increasing availability and reliability of the air data systems. In some examples, pneumatic static pressure sensors that are disposed, e.g., flush with the aircraft skin, can be utilized in combination with the laser air data sensors and acoustic air data sensors to further increase diversity of the utilized technologies, thereby further increasing system reliability and safety while maintaining the low profile aspects of the air data systems.

Figure 1:
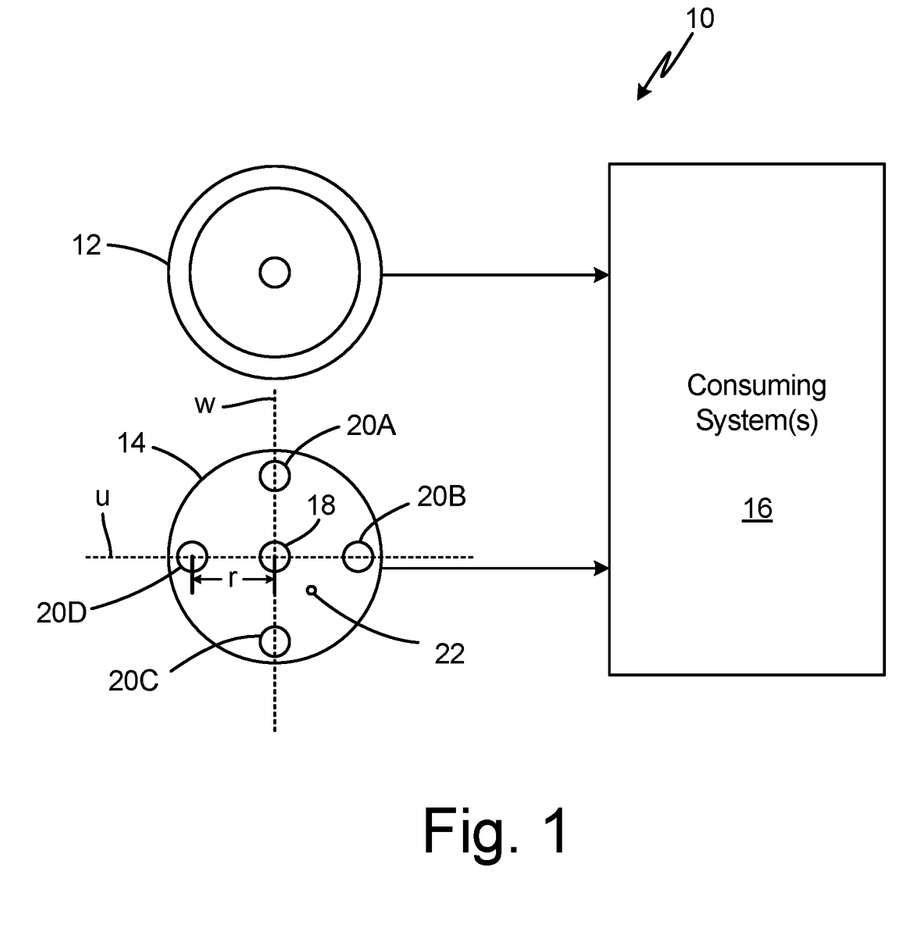
FIG. 1 is a schematic block diagram illustrating an example system that includes a laser air data sensor and an acoustic air data sensor.

FIG. 1 is a schematic block diagram illustrating system 10 including laser air data sensor 12 and acoustic air data sensor 14 that provide air data parameter outputs to one or more consuming systems 16. Acoustic air data sensor 14, as illustrated in FIG. 1, includes acoustic transmitter 18, acoustic receivers 20A, 20B, 20C, and 20D, and static pressure port 22.

Laser air data sensor 12 and acoustic air data sensor 14 are configured to be mounted on an aircraft to generate air data parameter outputs that are provided to consuming systems 16 for operational control of the aircraft. Each of laser air data sensor 12 and acoustic air data sensor 14 can be mounted on the aircraft such that an exterior face of the sensor is flush with the aircraft exterior (e.g., the aircraft skin). While illustrated and described in the example of FIG. 1 as including a single laser air data sensor 12 and a single acoustic air data sensor 14, it should be understood that system 10 can include any one or more laser air data sensors and any one or more acoustic air data sensors. In some examples, system 10 can include one or more pneumatic static pressure ports (e.g., flush static ports) that sense static pressure of the air about the aircraft exterior and provide the sensed static pressure to one or more of the laser and/or acoustic air data sensors, as is further described below.

Laser air data sensor 12 is configured to emit directional light (e.g., laser light) through a window or other optical element into the atmosphere. For instance, in some examples, laser air data sensor 12 is configured to emit directional light along three or more axes into the airflow about the exterior of the aircraft. The three axes (or three of four or more axes) can, in certain examples, be mutually orthogonal, though the three axes need not be mutually orthogonal in all examples. In general, laser air data sensor 12 emits directional light into the airflow along three or more axes that are each angularly separated by a threshold angle (or angles) that enables identification of velocities of the airflow along each of the three or more distinct axes.

Laser air data sensor 12 receives returns of the directional light in each of the three or more axes due to reflection (or scattering) of the emitted directional light from molecules and/or aerosols that move with the airflow. For example, based on the returns of the emitted directional light off aerosols or other particulates in the air, known in the art as Mie scattering, laser air data sensor 12 can determine a line of sight Doppler shift of the emitted directional light along each respective axis. From the determined Doppler shifts, laser air data sensor 12 determines velocity information of the airflow in each of the three or more axes. Laser air data sensor 12 utilizes the velocity information of the airflow in each of the three or more axes to determine airspeed information as well as a relative wind angle of the airflow corresponding to angle of attack (i.e., an angle between the direction of the oncoming airflow or relative wind and a reference line of the aircraft, such as a chord of a wing of the aircraft) and angle of sideslip (i.e., angle between the direction of the oncoming airflow or relative wind and an aircraft centerline extending through the nose of the aircraft). As such, laser air data sensor 12 determines, based on the returns of the emitted directional light, aircraft air data parameter outputs, such as aircraft angle of attack, aircraft angle of sideslip, aircraft true airspeed, or other air data parameter outputs.

In some examples, laser air data sensor 12 can be a molecular-based laser air data sensor that receives returns of emitted directional light off molecules in the air, known in the art as Rayleigh scattering. In such examples, laser air data sensor 12 can additionally determine, based on the Rayleigh scattering, density information of the air from which laser air data sensor 12 can derive static pressure and static temperature of the airflow about the aircraft exterior. Laser air data sensor 12 utilizes the static pressure and static temperature information to determine pressure and temperature-based air data parameter outputs, such as altitude, Mach number, or other pressure and/or temperature-based air data parameter outputs.

As illustrated in FIG. 1, acoustic air data sensor 14 includes acoustic transmitter 18 and acoustic receivers 20A-20D. Acoustic transmitter 18 can be a piezoelectric speaker, a cone speaker, a micro-electro-mechanical systems (MEMS) speaker, or other electric-to-acoustic transducer. Acoustic receivers 20A-20D can be microphones including MEMS microphones, condenser microphones, or other acoustic-to-electric transducers.

Acoustic air data sensor 14 is configured to emit acoustic signals from acoustic transmitter 18 that are influenced by the airflow over the aircraft exterior as the acoustic signals propagate to acoustic receivers 20A-20D. Acoustic signals emitted by acoustic transmitter 18 can take the form of an acoustic pulse, an oscillating acoustic signal, a broadband acoustic signal, a random source acoustic signal, or other form of acoustic signal. In some examples, acoustic signals emitted by acoustic transmitter 18 can be ultrasonic acoustic signals, such as signals having a frequency greater than 20 kilohertz (kHz). In other examples, acoustic signals emitted by acoustic transmitter 18 can have a frequency that is in the audible range.

Acoustic receivers 20A-20D, in the example of FIG. 1, are disposed at a known radius (r) from acoustic transmitter 18. In some examples, the distance (r) between acoustic receivers 20A-20D and acoustic transmitter 18 can be a same distance. In other examples, the distance (r) between each of acoustic receivers 20A-20D and acoustic transmitter 18 can differ. For instance, the distance (r) between each of acoustic receivers 20A-20D and acoustic transmitter 18 can be between four and five inches, or other distances.

As illustrated in FIG. 1, acoustic receivers 20A-20D are disposed about acoustic transmitter 18 such that axis (u) extending through acoustic receivers 20A and 20C is orthogonal to axis (w) extending through acoustic receivers 20B and 20D. Though illustrated and described in the example of FIG. 1 as including four acoustic receivers 20A-20D, it should be understood that acoustic air data sensor 14 can include more than four acoustic receivers, such as five or more acoustic receivers disposed about acoustic transmitter 18 at regular or irregular angular intervals.

Each of acoustic receivers 20A-20D receives the emitted acoustic signal at varying times, as the propagation of the emitted acoustic signal is influenced by the airflow over the aircraft exterior. Based on the known distance (r) between each of acoustic receivers 20A-20D and acoustic transmitter 18, acoustic air data sensor 14 determines a time of flight of the acoustic signal between acoustic transmitter 18 and each of acoustic receivers 20A-20D. Using two of acoustic receivers 20A-20D along a same axis (e.g., acoustic receivers 20A and 20C along axis w, or acoustic receivers 20B and 20D along axis u), acoustic air data sensor 14 determines a speed of sound in the direction of the two acoustic receivers.

For instance, acoustic air data sensor 14 can be positioned on a side of the aircraft. For an aircraft in the u-v-w three-dimensional space (e.g., the u axis extending along the body through the nose of the aircraft, the v axis orthogonal to the u axis and extending out through the side of the aircraft, and the w axis orthogonal to both the u and v axes and extending through the bottom of the aircraft), acoustic air data sensor 14 is positioned in the u-w geometric plane, as illustrated in FIG. 1. Accordingly, acoustic receivers 20A and 20C can be used to obtain a velocity in the w axis direction, and acoustic receivers 20B and 20D can be used to obtain a velocity in the u axis direction. The two determined velocities can be used to form a two-dimensional velocity vector for the u-w plane. Acoustic air data sensor 14 can utilize the two-dimensional velocity vector of the airflow to determine a relative wind angle of the airflow about the exterior of the aircraft, the relative wind angle corresponding to angle of attack or angle of sideslip. Because, in this example, acoustic air data sensor 14 is positioned on the side of the aircraft (i.e., in the u-w plane), the two-dimensional velocity vector can be used to determine a relative wind angle corresponding to an angle of attack for the aircraft.

In some examples, acoustic air data sensor 14 can be positioned on a top or bottom of the aircraft, e.g., in the u-v plane. In such an example, acoustic receivers 20A and 20C can be used to determine a velocity in the u axis direction (e.g., extending along the body of the aircraft through the nose of the aircraft), and acoustic receivers 20B and 20D can be used to determine a velocity in the v axis direction (e.g., orthogonal to the u axis and extending out through the side of the aircraft). Because, in such an example, acoustic air data sensor 14 is positioned on a top or bottom of the aircraft in the u-v plane, the two-dimensional velocity vector for the u-v plane can be used to determine a relative wind angle corresponding to an angle of sideslip of the aircraft.

In some examples, multiple (e.g., two or more) of acoustic air data sensor 14 can be positioned about the aircraft to obtain both angle of attack and angle of sideslip information. For instance, in certain examples, a first acoustic air data sensor 14 can be positioned on a side of the aircraft to obtain angle of attack information, and a second acoustic air data sensor 14 can be positioned on a top or bottom of the aircraft to obtain angle of sideslip information.

Acoustic air data sensor 14 can determine a static air temperature (SAT) of the airflow about the aircraft exterior, regardless of the orientation of acoustic air data sensor 14 as positioned on the exterior of the aircraft. For example, two of acoustic receivers 20A-20D positioned along a same axis (e.g., acoustic receivers 20A and 20C along axis w, or acoustic receivers 20B and 20D along axis u) can be used to sense acoustic signals emitted by acoustic transmitter 18. Acoustic receiver 20B, for example, can be used to determine the time of flight of the acoustic signals upstream from acoustic transmitter 18, and acoustic receiver 20D can be used to determine the time of flight of the acoustic signals downstream from acoustic transmitter 18. Based on the known distance (or distances) between acoustic transmitter 18 and each of acoustic receivers 20A and 20D (distance (r) in the example of FIG. 1), acoustic air data sensor 14 can determine the speed of sound in the airflow about the aircraft exterior. Acoustic air data sensor 14 can determine, based on the determined speed of sound, a static air temperature of the airflow, as is known in the art.

As illustrated in FIG. 1, acoustic air data sensor 14 includes static pressure port 22. Static pressure port 22 can be pneumatically connected (e.g., via tubing or other pneumatic connection) to a pressure transducer of acoustic air data sensor 14 to measure static pressure of the air about the exterior of the aircraft. In some examples, acoustic air data sensor 14 may not include static pressure port 22, but rather may receive static pressure information from a separate static pressure sensor device, as is further described below. In certain examples, acoustic air data sensor 14 can receive static pressure information from a static pressure sensor device that is disposed on an opposite side of the aircraft from acoustic air data sensor 14 to determine an average of static air pressures on opposite sides of the aircraft to compensate for, e.g., local (to the aircraft) pressure effects at the sensors caused by non-zero sideslip conditions of the aircraft. Acoustic air data sensor 14 can utilize the measured static pressure information to determine air data parameter outputs, such as aircraft altitude, calibrated airspeed, or other air data parameters that are based on static air pressure.

Accordingly, system 10 including laser air data sensor 12 and acoustic air data sensor 14 can provide multiple sets of air data parameter outputs including, e.g., aircraft altitude, angle of attack, angle of sideslip, airspeed, Mach number, or other air data parameter outputs to consuming systems 16. Such multiple sets of air data parameter outputs (i.e., provided by each of laser air data sensor 12 and acoustic air data sensor 14) can increase reliability and availability of the air data parameter outputs for use by consuming systems 16 by virtue of redundancy of the air data parameter outputs as well as diversity of technologies by which the air data parameter outputs are sensed (i.e., both laser-based sensing and acoustic-based sensing). Moreover, the low-profile nature of both laser air data sensor 12 and acoustic air data sensor 14 (e.g., disposed flush with the aircraft skin) can help to reduce both drag on the aircraft and susceptibility of the sensors to failure modes associated with icing conditions.

Figure 2:
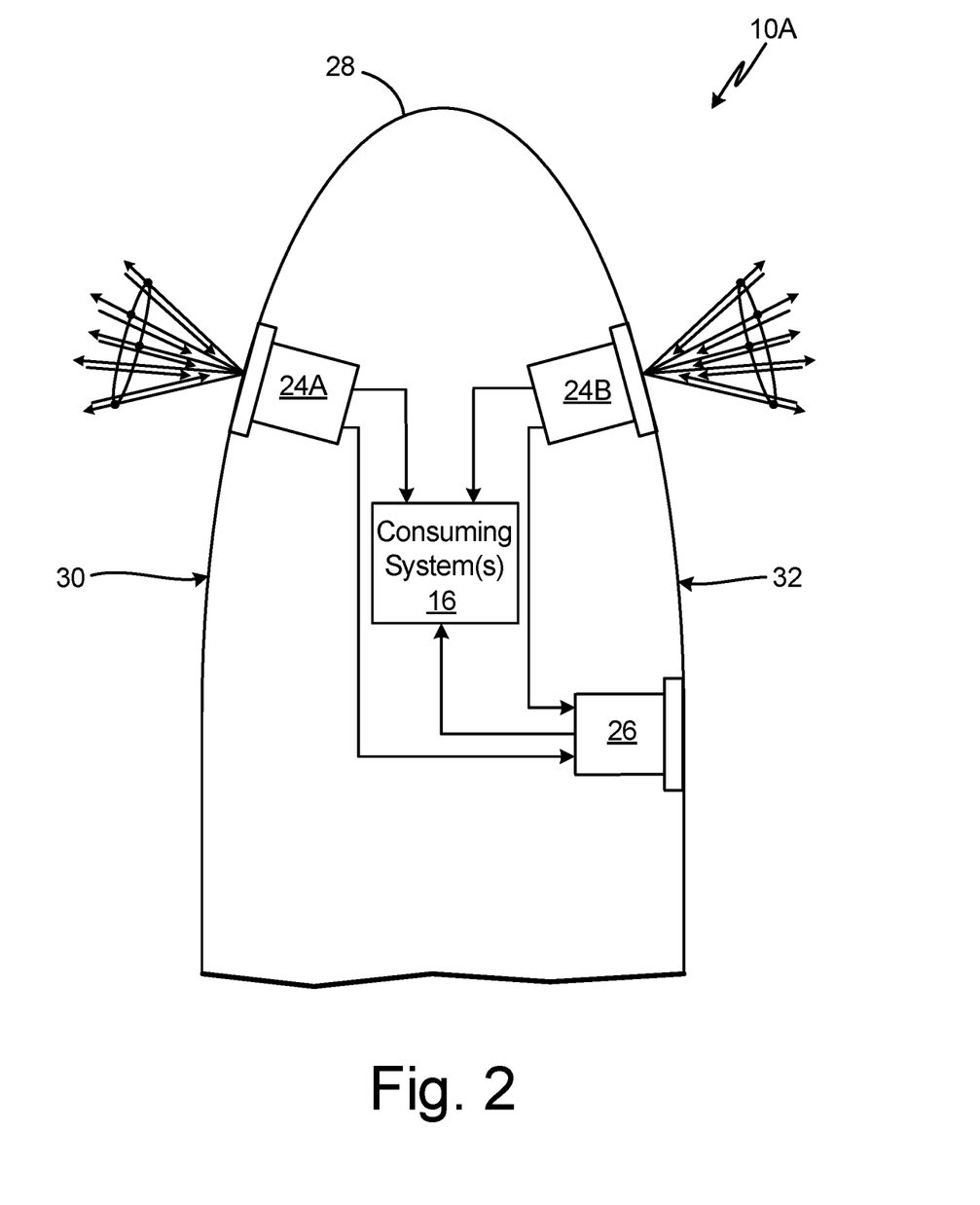
FIG. 2 is a schematic block diagram illustrating an example air data system architecture including two laser air data sensors and an acoustic air data sensor.

FIG. 2 is a schematic block diagram illustrating air data system architecture 10A for providing air data parameter outputs to consuming systems 16. As illustrated in FIG. 2, architecture 10A includes laser air data sensors 24A and 24B, as well as acoustic air data sensor 26 mounted on aircraft 28. In the example of FIG. 2, laser air data sensor 24A is disposed on side 30 of aircraft 28. Laser air data sensor 24B and acoustic air data sensor 26 are disposed on side 32 of aircraft 28, opposite side 30. In other examples, any one or more of laser air data sensors 24A and 24B as well as acoustic air data sensor 26 can be disposed on a same side of aircraft 28 (i.e., one of sides 30 and 32), a top of aircraft 28, a bottom of aircraft 28, or combinations thereof.

Laser air data sensors 24A and 24B can be substantially similar to laser air data sensor 12 of FIG. 1. In the example of FIG. 2, each of laser air data sensors 24A and 24B is a molecular-based laser air data sensor configured to receive returns of emitted directional light off molecules in the air (i.e., Rayleigh scattering). As such, each of laser air data sensors 24A and 24B is configured to emit directional light in three or more directions into airflow about the aircraft exterior, and to determine air data parameters, such as aircraft angle of attack, aircraft angle of sideslip, airspeed, or other aircraft air data parameters based on velocities of the airflow along each respective axis based on the received returns of the emitted directional light. In addition, each of laser air data sensors 24A and 24B is configured to determine, based on the Rayleigh scattering, density information of the air from which laser air data sensors 24A and 24B derive static pressure and static temperature of the exterior airflow.

Acoustic air data sensor 26, in the example of FIG. 2, can be substantially similar to acoustic air data sensor 14 of FIG. 1. In the example of FIG. 2, however, acoustic air data sensor 26 does not include static port 22 (FIG. 1). As such, acoustic air data sensor 26 is electrically connected to receive static pressure information from laser air data sensors 24A and 24B, though in other examples, acoustic air data sensor 26 can receive the static pressure information from only one of laser air data sensors 24A and 24B.

As illustrated in FIG. 2, each of laser air data sensor 24A, laser air data sensor 24B, and acoustic air data sensor 26 is electrically connected to transmit air data parameter outputs to consuming systems 16. In addition, in the example of FIG. 2, acoustic air data sensor 26 is electrically connected to receive static pressure information from laser air data sensors 24A and 24B. Electrical connections illustrated in FIG. 2 can take the form of direct electrical couplings and/or data bus couplings configured to communicate according to one or more communication protocols, such as the Aeronautical Radio, Incorporated (ARINC) 429 communication protocol, controller area network (CAN) bus communication protocol, military standard 1553 (MIL-STD-1553) communication protocol, or other analog or digital communication protocols.

In operation, each of laser air data sensors 24A and 24B emits directional light into the airflow about the exterior of aircraft 28 along three or more axes. Laser air data sensors 24A and 24B each determine, based on received returns of the emitted directional light, air data parameters including, e.g., altitude (i.e., based on determined static pressure), airspeed (e.g., calibrated airspeed and/or true airspeed), Mach number, angle of attack, angle of sideslip, or other air data parameter outputs.

Acoustic air data sensor 26 emits acoustic signals into the airflow about the exterior of aircraft 28 and determines air data parameter outputs, such as airspeed and one of angle of attack or angle of sideslip (i.e., depending upon installation orientation, as described above with respect to the example of FIG. 1). Acoustic air data sensor 26, in the example of FIG. 2, receives static pressure information from laser air data sensors 24A and 24B, and utilizes the static pressure information to generate pressure-based air data parameter outputs, such as altitude.

Each of laser air data sensor 24A, laser air data sensor 24B, and acoustic air data sensor 26 transmits the respective air data parameter outputs to consuming systems 16. Consuming systems 16, which can include aircraft systems such as flight management systems, auto-flight control systems, standby instrument systems, display systems, data concentrator units, or other consuming systems of the air data parameter outputs, utilize the air data parameter outputs for operational control of aircraft 28 (e.g., controlled flight or other operations). Accordingly, air data system architecture 10A provides three sets of air data parameter outputs (e.g., three redundant sets of information) to consuming systems 16, thereby increasing system safety and reliability.

Figure 3:
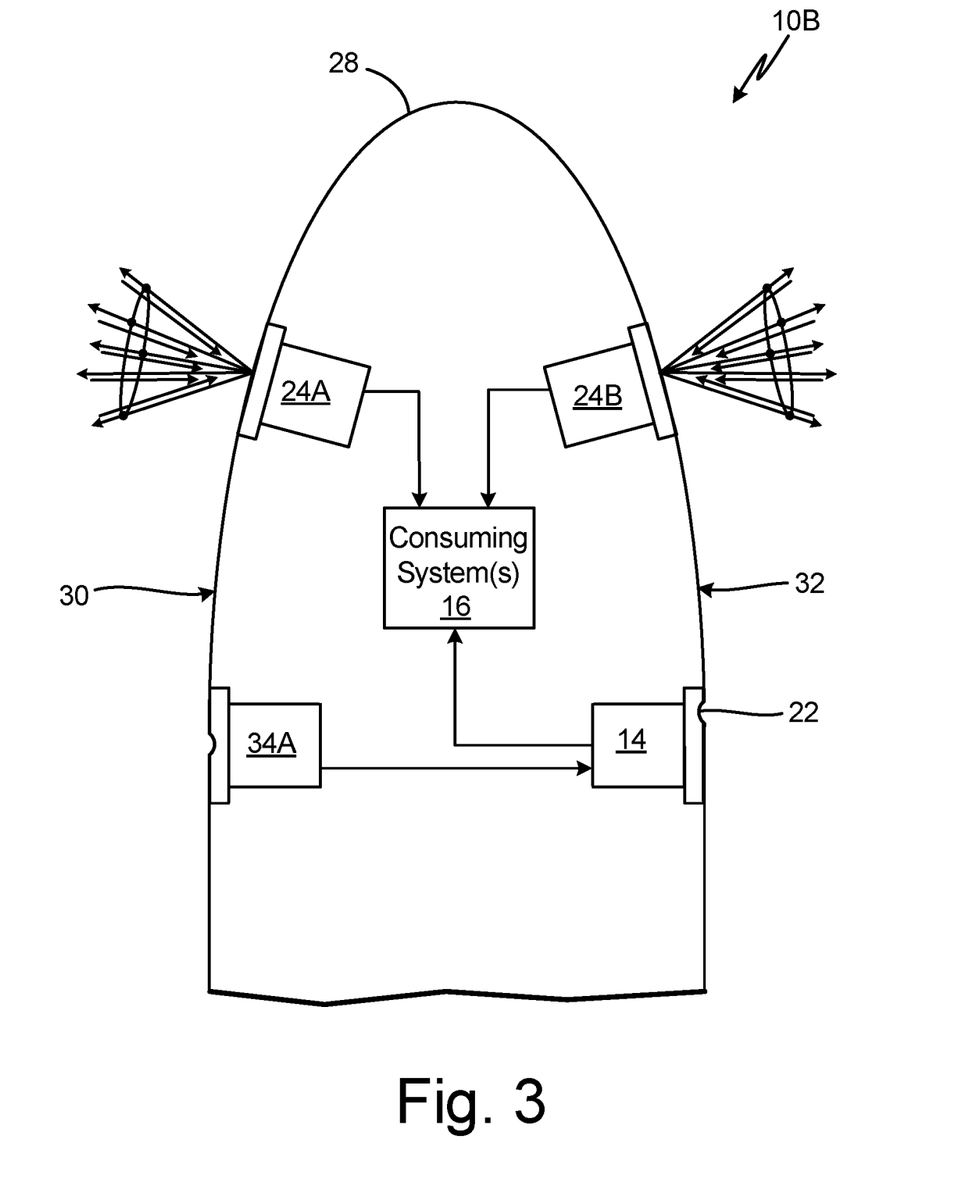
FIG. 3 is a schematic block diagram illustrating an example air data system architecture including two laser air data sensors, an acoustic air data sensor, and a static pressure sensor.

FIG. 3 is a schematic block diagram illustrating air data system architecture 10B for providing air data parameter outputs to consuming systems 16. As illustrated in FIG. 3, architecture 10B includes laser air data sensors 24A and 24B, acoustic air data sensor 14, and static pressure sensor 34A. In the example of FIG. 3, laser air data sensor 24A and static pressure sensor 34A are disposed at side 30 of aircraft 28, and laser air data sensor 24B and acoustic air data sensor 14 are disposed at side 32 of aircraft 28. Each of laser air data sensors 24A and 24B, as described above with respect to FIG. 2, are molecular-based laser air data sensors configured to determine air data parameter outputs, including static pressure-based and static air temperature-based air data parameter outputs (e.g., altitude, calibrated airspeed, or other parameters) derived from density information determined based on Rayleigh scattered returns of emitted directional light.

Acoustic air data sensor 14, in this example, includes static pressure port 22 (and the associated pressure transducer) to measure static pressure of the external air, as was described above with respect to FIG. 1. Static pressure sensor 34A, mounted flush with the exterior of aircraft 28, includes a static pressure port pneumatically connected to a pressure transducer (not shown) for sensing static pressure of the air about the exterior of aircraft 28.

As illustrated in FIG. 3, each of laser air data sensor 24A, laser air data sensor 24B, and acoustic air data sensor 14 are electrically connected to transmit air data parameter outputs to consuming systems 16. In addition, as illustrated in FIG. 3, acoustic air data sensor 14 is electrically connected to static pressure sensor 34A to receive measured static pressure information from static pressure sensor 34A.

Acoustic air data sensor 14 can utilize the static pressure measured via static pressure port 22 in combination with the measured static pressure information received from cross-side static pressure sensor 34A (i.e., disposed on side 30, opposite side 32) to determine pressure-based air data parameters, such as altitude, calibrated airspeed, or other pressure-based air data parameters. For instance, because acoustic air data sensor 14 and static pressure sensor 34A measure static pressure from within the boundary layer of airflow over the exterior of aircraft 28 (e.g., within six inches from the exterior skin of aircraft 28), such measured static pressures can be influenced by local airflow effects over the exterior of aircraft 28 that vary with, e.g., aircraft sideslip. As such, acoustic air data sensor 14 can average or otherwise combine the static pressure measured via static pressure port 22 and the static pressure received from static pressure sensor 34A (e.g., disposed at an opposite side of aircraft 28) to compensate for local airflow effects caused by a sideslip condition. Acoustic air data sensor 14 can therefore determine pressure-based air data parameter outputs, such as altitude and calibrated airspeed, based on the averaged (or otherwise combined) static pressures measured at each of sides 30 and side 32 of aircraft 28.

Figure 4:
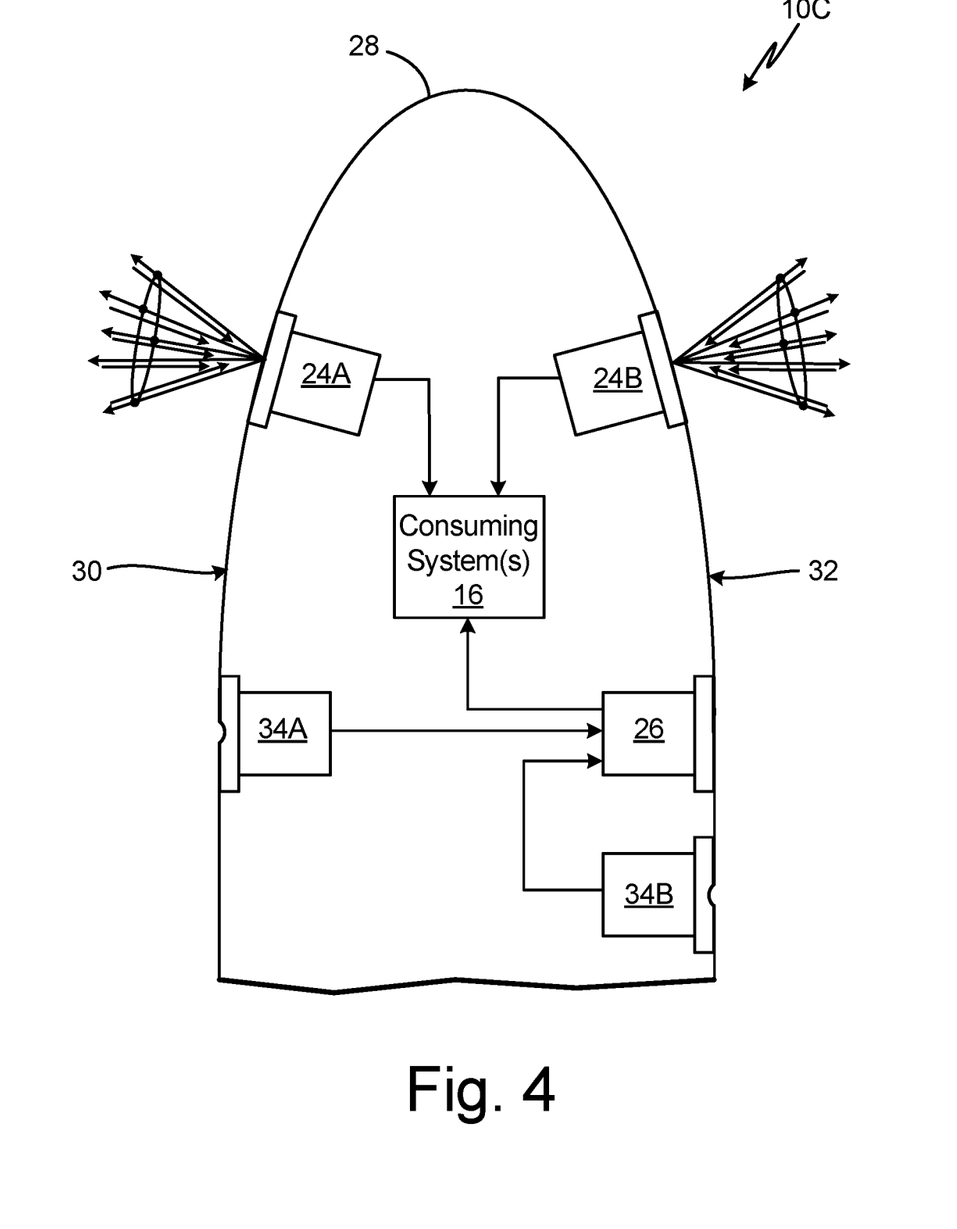
FIG. 4 is a schematic block diagram illustrating an example air data system architecture including two laser air data sensors, an acoustic air data sensor, and two static pressure sensors.

FIG. 4 is a schematic block diagram illustrating air data system architecture 10C for providing air data parameter outputs to consuming systems 16. As illustrated in FIG. 4, architecture 10C includes laser air data sensors 24A and 24B, acoustic air data sensor 26, static pressure sensor 34A, and static pressure sensor 34B. In the example of FIG. 4, laser air data sensor 24A and static pressure sensor 34A are disposed at side 30 of aircraft 28. Laser air data sensor 24B, acoustic air data sensor 14, and static pressure sensor 34B are disposed at side 32 of aircraft 28.

Each of laser air data sensors 24A and 24B, as described above with respect to FIGS. 2 and 3, are molecular-based laser air data sensors configured to determine air data parameter outputs, including static pressure-based and static air temperature-based air data parameter outputs. Acoustic air data sensor 26, as described above with respect to FIG. 2, is similar to acoustic air data sensor 14 (FIGS. 1 and 3), but does not include a static pressure port (i.e., static pressure port 22). Static pressure sensor 34B can be substantially similar to static pressure sensor 34A, described above with respect to FIG. 3 as including a static pressure port pneumatically connected to a pressure transducer to sense static pressure of the air about the exterior of aircraft 28.

As illustrated in FIG. 4, each of laser air data sensor 24A, laser air data sensor 24B, and acoustic air data sensor 26 are electrically connected to transmit air data parameter outputs to consuming systems 16. In addition, as illustrated in FIG. 4, acoustic air data sensor 26 is electrically connected to static pressure sensor 34A to receive measured static pressure information from static pressure sensor 34A, disposed at side 30 of aircraft 28. Acoustic air data sensor is electrically connected to static pressure sensor 34B to receive measured static pressure information from static pressure sensor 34B, disposed at side 32 of aircraft 28.

Acoustic air data sensor 26 can utilize the static press measurements received from static pressure sensor 34A and static pressure sensor 34B (i.e., cross-side static pressure sensors) to determine pressure-based air data parameters, such as altitude, calibrated airspeed, or other pressure-based air data parameters. For instance, acoustic air data sensor 26 can average or otherwise combine the static pressure measurements received from static pressure sensor 34A and static pressure sensor 34B. Accordingly, architecture 10C is similar to architecture 10B of FIG. 3, but rather than include a static pressure sensor as integral to the acoustic air data sensor (e.g., static pressure port 22 of acoustic air data sensor 14 of FIG. 3), acoustic air data sensor 26 receives static pressure measurement data from static pressure sensor 34B.

Figure 5:
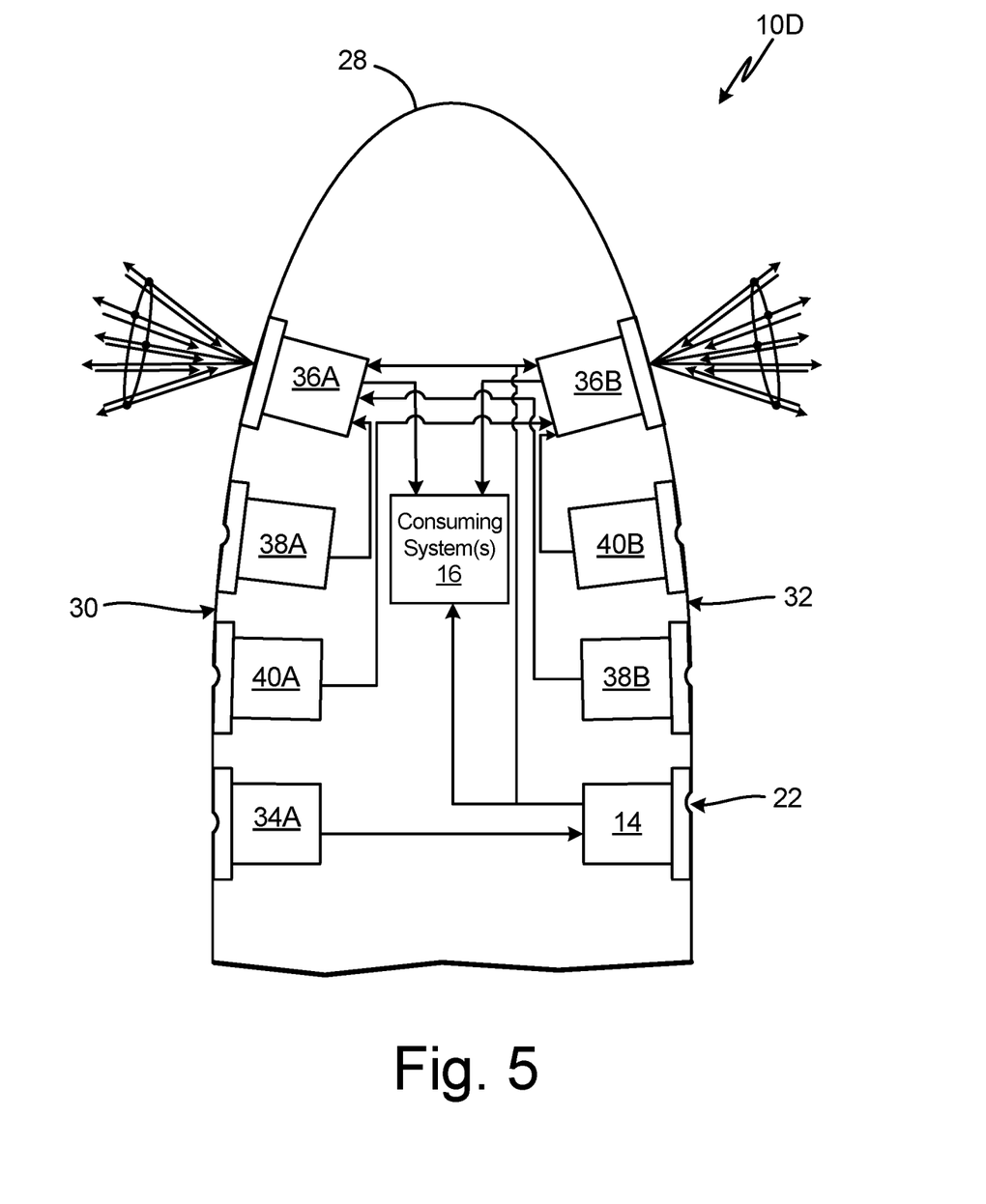
FIG. 5 is a schematic block diagram illustrating an example air data system architecture including two laser air data sensors, an acoustic air data sensor, and five static pressure sensors.

FIG. 5 is a schematic block diagram illustrating air data system architecture 10D for providing air data parameter outputs to consuming systems 16. As illustrated in FIG. 5, architecture 10D includes laser air data sensor 36A, laser air data sensor 36B, acoustic air data sensor 14, static pressure sensor 34A, static pressure sensor 38A, static pressure sensor 38B, static pressure sensor 40A, and static pressure sensor 40B. In the example of FIG. 5, laser air data sensor 36A, static pressure sensor 34A, static pressure sensor 38A, and static pressure sensor 40A are disposed at side 30 of aircraft 28. Laser air data sensor 36B, static pressure sensor 40B, static pressure sensor 38B, and acoustic air data sensor 14 are disposed at side 32 of aircraft 28.

Each of static pressure sensors 38A, 38B, 40A, and 40B can be substantially similar to static pressure sensor 34A, described above with respect to FIGS. 3 and 4 as including a static pressure port pneumatically connected to a pressure transducer to sense static pressure of air about the exterior of aircraft 28. Acoustic air data sensor 14, as described above with respect to FIGS. 1 and 3, includes static pressure port 22 pneumatically connected to a pressure transducer to sense static pressure of the air about the exterior of aircraft 28. In addition, acoustic air data sensor 14 is electrically connected to receive static pressure measurement information from static pressure sensor 34A (disposed on side 30 of aircraft 28).

In the example of FIG. 5, each of laser air data sensors 36A and 36B is a particulate-based laser air data sensor configured to determine air data parameter outputs based on returns of emitted directional light off aerosols or other particulates in the air (i.e., Mie scattering). As such, rather than determine pressure and temperature information based on returns of emitted directional light, laser air data sensors 36A and 36B receive pressure information from static pressure sensors 38A, 38B, 40A, and 40B, and static air temperature information from acoustic air data sensor 14.

For example, as illustrated in FIG. 5, laser air data sensor 36A is electrically connected to receive static pressure information from static pressure sensor 38A (disposed on side 30 of aircraft 28) and from static pressure sensor 38B (disposed on side 32 of aircraft 28). Laser air data sensor 36B is electrically connected to receive static pressure information from static pressure sensor 40A (disposed on side 30 of aircraft 28) and from static pressure sensor 40B (disposed on side 32 of aircraft 28). In addition, as illustrated in FIG. 5, laser air data sensors 36A and 36B are electrically connected to receive static air temperature measurement information from acoustic air data sensor 14. Laser air data sensors 36A and 36B utilize the received static air temperature information for determining temperature-based air data parameter outputs, such as Mach number.

In operation, each of laser air data sensors 36A and 36B emits directional light along three or more axes into the airflow about the exterior of aircraft 28. Each of laser air data sensors 36A and 36B determines, based on returns of the emitted directional light (i.e., based on Mie scattering off aerosols or other particulates in the air), velocity information along each of the three or more axes. Laser air data sensors 36A and 36B determine air data parameter outputs, such as airspeed, angle of attack, and angle of sideslip, based on the velocities in the three or more directions. Laser air data sensors 36A and 36B utilize measured static pressure data received from static pressure sensors 38A and 38B (i.e., utilized by laser air data sensor 36A) and static pressure sensors 40A and 40B (i.e., utilized by laser air data sensor 36B) to determine pressure-based air data parameter outputs, such as altitude, calibrated airspeed, or other pressure-based air data parameter outputs. Laser air data sensors 36A and 36B utilize measured static air temperature information received from acoustic air data sensor 14 to generate temperature-based air data parameter outputs, such as Mach number, or other temperature-based air data parameter outputs. Each of laser air data sensors 36A and 36B transmit, via aircraft communications data bus or otherwise, the determined set of air data parameter outputs to consuming systems 16.

Acoustic air data sensor 14 generates air data parameter outputs, such as airspeed, Mach number, and one of angle of attack or angle of sideslip (i.e., depending upon installation orientation), based on acoustic signals transmitted and received by acoustic air data sensor 14. Acoustic air data sensor 14 generates pressure-based air data parameter outputs, such as altitude, calibrated airspeed, or other pressure-based air data parameter outputs, based on static pressure measurements received via static pressure port 22 and cross-side static pressure sensor 34A. Acoustic air data sensor 14 transmits the determined set of air data parameter outputs to consuming systems 16. Accordingly, laser air data sensor 36A, laser air data sensor 36B, and acoustic air data sensor 14 can each provide air data parameter outputs, including, e.g., aircraft altitude, angle of attack, angle of sideslip, airspeed, Mach number, or other air data parameter outputs to consuming systems 16.

Figure 6:
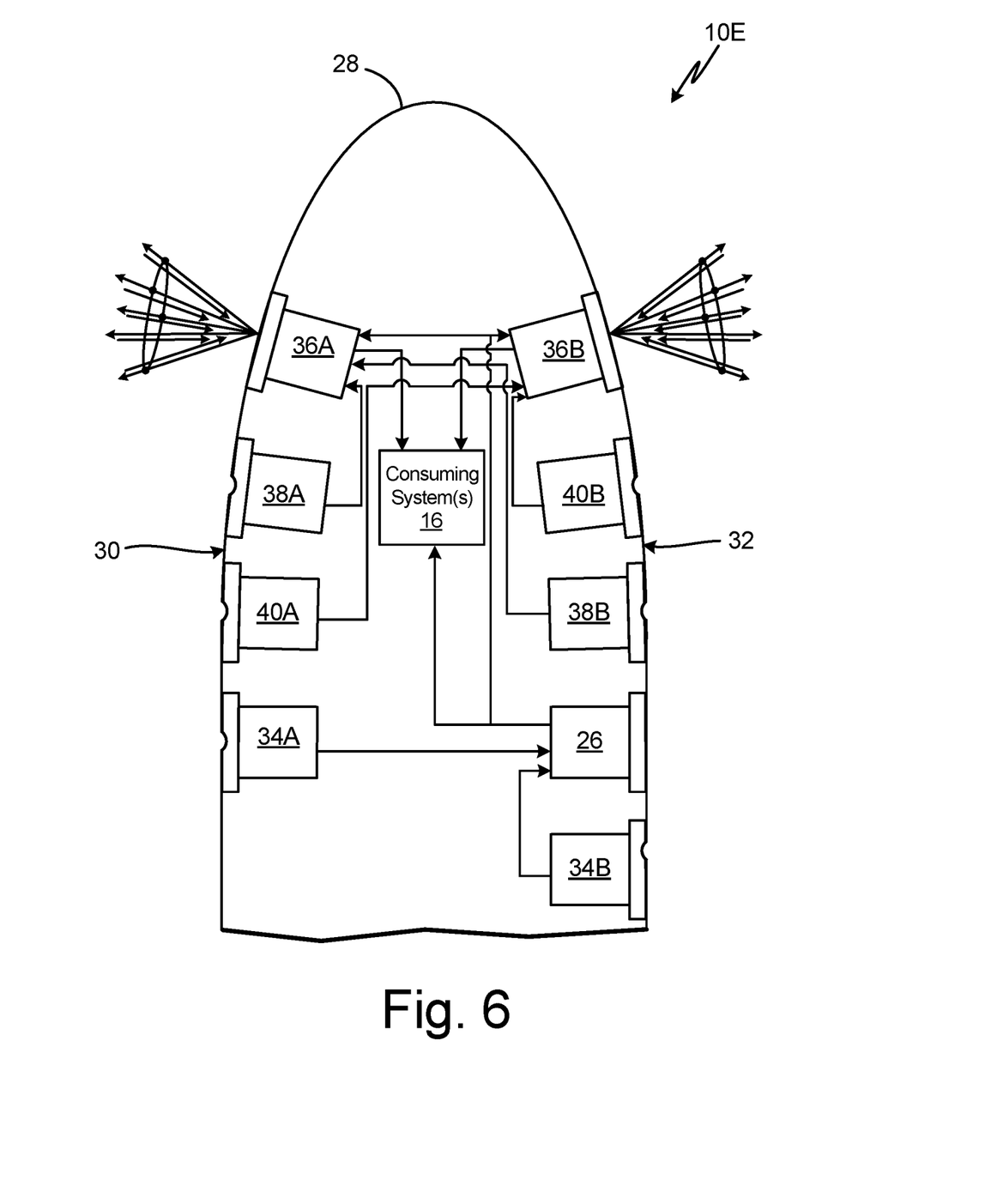
FIG. 6 is a schematic block diagram illustrating an example air data system architecture including two laser air data sensors, an acoustic air data sensor, and six static pressure sensors.

FIG. 6 is a schematic block diagram illustrating air data system architecture 10E for providing air data parameter outputs to consuming systems 16. As illustrated in FIG. 6, architecture 10E includes laser air data sensor 36A, laser air data sensor 36B, acoustic air data sensor 14, static pressure sensor 34A, static pressure sensor 34B, static pressure sensor 38A, static pressure sensor 38B, static pressure sensor 40A, and static pressure sensor 40B. The example architecture 10E of FIG. 6 is similar to architecture 10D of FIG. 5. However, rather than include acoustic air data sensor 14 having static pressure port 22 (FIG. 5), architecture 10E includes acoustic air data sensor 26 that does not include a static pressure port. Accordingly, the example architecture 10E of FIG. 6 includes static pressure sensor 34B that provides measured static pressure information to acoustic air data sensor 26.

In the example of FIG. 6, laser air data sensor 36A, static pressure sensor 34A, static pressure sensor 38A, and static pressure sensor 40A are disposed at side 30 of aircraft 28. Laser air data sensor 36B, static pressure sensor 40B, static pressure sensor 38B, static pressure sensor 34B, and acoustic air data sensor 26 are disposed at side 32 of aircraft 28.

Each of laser air data sensors 36A and 36B, as described above with respect to the example of FIG. 5, is a particulate-based laser air data sensor configured to determine air data parameter outputs based on returns of emitted directional light off aerosols or other particulates in the air (i.e., Mie scattering). Each of static pressure sensors 34A, 34B, 38A, 38B, 40A, and 40B includes a static pressure port (and corresponding pressure transducer) configured to measure static pressure of the airflow about the exterior of aircraft 28.

Laser air data sensor 36A is electrically connected to receive static pressure information from static pressure sensor 38A (disposed on side 30 of aircraft 28) and from static pressure sensor 38B (disposed on side 32 of aircraft 28). Laser air data sensor 36B is electrically connected to receive static pressure information from static pressure sensor 40A (disposed on side 30 of aircraft 28) and from static pressure sensor 40B (disposed on side 32 of aircraft 28). In addition, as illustrated in FIG. 6, laser air data sensors 36A and 36B are electrically connected to receive static air temperature measurement information from acoustic air data sensor 26. Laser air data sensors 36A and 36B utilize the received static air temperature information for determining temperature-based air data parameter outputs, such as Mach number.

In operation, each of laser air data sensors 36A and 36B emits directional light along three or more axes into the airflow about the exterior of aircraft 28. Each of laser air data sensors 36A and 36B determines, based on returns of the emitted directional light (i.e., based on Mie scattering off aerosols or other particulates in the air), velocity information along each of the three or more axes. Laser air data sensors 36A and 36B determine air data parameter outputs, such as airspeed, angle of attack, and angle of sideslip, based on the velocities in the three or more directions. Laser air data sensors 36A and 36B utilize measured static pressure data received from static pressure sensors 38A and 38B (i.e., utilized by laser air data sensor 36A) and static pressure sensors 40A and 40B (i.e., utilized by laser air data sensor 36B) to determine pressure-based air data parameter outputs, such as altitude, calibrated airspeed, or other pressure-based air data parameter outputs. Laser air data sensors 36A and 36B utilize measured static air temperature information received from acoustic air data sensor 26 to generate temperature-based air data parameter outputs, such as Mach number, or other temperature-based air data parameter outputs. Each of laser air data sensors 36A and 36B transmit, via aircraft communications data bus or otherwise, the determined set of air data parameter outputs to consuming systems 16.

Acoustic air data sensor 26 generates air data parameter outputs, such as airspeed, Mach number, and one of angle of attack or angle of sideslip (i.e., depending upon installation orientation), based on acoustic signals transmitted and received by acoustic air data sensor 26. Acoustic air data sensor 26 generates pressure-based air data parameter outputs, such as altitude, calibrated airspeed, or other pressure-based air data parameter outputs, based on static pressure measurements received from static pressure sensors 34A and 34B. Acoustic air data sensor 26 transmits the determined set of air data parameter outputs to consuming systems 16. Accordingly, laser air data sensor 36A, laser air data sensor 36B, and acoustic air data sensor 26 can each provide air data parameter outputs, including, e.g., aircraft altitude, angle of attack, angle of sideslip, airspeed, Mach number, or other air data parameter outputs to consuming systems 16.

Accordingly, techniques of this disclosure enable multiple (e.g., redundant) sets of air data parameter outputs (e.g., altitude, angle of attack, angle of sideslip, airspeed, Mach number, or other air data parameter outputs) to be provided to consuming systems 16 for use in operational control of an aircraft. Such multiple sets of air data parameter outputs can increase reliability and availability of the air data parameter outputs for use by consuming systems 16 by virtue of redundancy of the air data parameter outputs as well as diversity of technologies by which the air data parameter outputs are sensed. Moreover, the low-profile nature of the air data sensors described herein (e.g., disposed flush with the aircraft skin) can help to reduce both drag on the aircraft and susceptibility of the sensors to failure modes associated with icing conditions.

Any of the sensors and/or systems described herein can include one or more processors and computer-readable memory encoded with instructions that, when executed by the one or more processors, cause the sensors and/or systems to operate in accordance with techniques of this disclosure. Examples of one or more processors can include any one or more of a microprocessor, a digital signal processor (DSP), an application specific integrated circuit (ASIC), a field-programmable gate array (FPGA), or other equivalent discrete or integrated logic circuitry. Computer-readable memory of sensors and/or systems can be configured to store information within the corresponding sensors and/or systems during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, flash memories, or forms of electrically programmable memories (EPROM) or electrically erasable and programmable (EEPROM) memories.

Discussion of Possible Embodiments

The following are non-exclusive descriptions of possible embodiments of the present invention.

A system includes a first laser air data sensor and an acoustic air data sensor. The first laser air data sensor is configured to emit first directional light into airflow about an aircraft exterior and to generate first air data parameter outputs for the aircraft based on returns of the emitted first directional light. The acoustic air data sensor is configured to emit acoustic signals into the airflow about the aircraft exterior, sense the acoustic signals, and generate second air data parameter outputs for the aircraft based on the sensed acoustic signals.

The system of the preceding paragraph can optionally include, additionally and/or alternatively, any one or more of the following features, configurations and/or additional components:

An exterior surface of each of the first laser air data sensor and the acoustic air data sensor can be disposed flush with the aircraft exterior.

The first laser air data sensor can be a molecular-based laser air data sensor configured to receive the returns of the emitted first directional light scattered by air molecules within the airflow about the aircraft exterior, and determine, based on the returns of the emitted first directional light scattered by the air molecules within the airflow, first static pressure of the airflow, first static air temperature of the airflow, first true airspeed of the airflow, and a first relative wind angle of the first laser air data sensor with respect to the airflow.

The acoustic air data sensor can be electrically coupled to receive the first static pressure of the airflow from the first laser air data sensor. The acoustic air data sensor can be configured to determine an altitude of the aircraft based on the first static pressure of the airflow received from the first laser air data sensor, and generate the second air data parameter outputs as including the determined altitude.

The acoustic air data sensor can include a static pressure sensor configured to sense second static pressure of the airflow about the aircraft exterior. The acoustic air data sensor can be configured to determine the altitude of the aircraft based on the first static pressure of the airflow received from the first laser air data sensor and the second static pressure of the airflow sensed by the static pressure sensor.

The system can further include a first static pressure sensor configured to sense first static pressure of the airflow about the aircraft exterior, and a second static pressure sensor configured to sense second static pressure of the airflow about the aircraft exterior. The acoustic air data sensor can be electrically coupled to receive the first static pressure from the first static pressure sensor and to receive the second static pressure from the second static pressure sensor. The acoustic air data sensor can be configured to determine altitude of the aircraft based on the first static pressure and the second static pressure.

The first static pressure sensor can be disposed at a first side of the aircraft. The second static pressure sensor can be disposed at a second side of the aircraft, opposite the first side of the aircraft.

The system can further include a second laser air data sensor configured to emit second directional light into the airflow about the aircraft exterior and to generate third air data parameter outputs for the aircraft based on returns of the emitted second directional light.

The second laser air data sensor can be a molecular-based laser air data sensor configured to receive the returns of the emitted second directional light scattered by air molecules within the airflow about the aircraft exterior, and determine, based on the returns of the emitted second directional light scattered by the air molecules within the airflow about the aircraft exterior, second static pressure of the airflow, second static air temperature of the airflow, second true airspeed of the airflow, and a second relative wind angle of the second laser air data sensor with respect to the airflow.

The system can further include a first static pressure sensor configured to sense a first static pressure of the airflow about the aircraft exterior, a second static pressure sensor configured to sense a second static pressure of the airflow about the aircraft exterior, a third static pressure sensor configured to sense a third static pressure of the airflow about the aircraft exterior, a fourth static pressure sensor configured to sense a fourth static pressure of the airflow about the aircraft exterior, a fifth static pressure sensor configured to sense a fifth static pressure of the airflow about the aircraft exterior, and a sixth static pressure sensor configured to sense a sixth static pressure of the airflow about the aircraft exterior.

The first laser air data sensor can be electrically connected to receive the first static pressure from the first static pressure sensor and the second static pressure from the second static pressure sensor. The first laser air data sensor can be configured to determine a first altitude parameter of the first air data parameter outputs based on the first static pressure and the second static pressure. The second laser air data sensor can be electrically connected to receive the third static pressure from the third static pressure sensor and the fourth static pressure from the fourth static pressure sensor. The second laser air data sensor can be configured to determine a second altitude parameter of the second air data parameter outputs based on the third static pressure and the fourth static pressure. The acoustic air data sensor can be electrically connected to receive the fifth static pressure from the fifth static pressure sensor and the sixth static pressure from the sixth static pressure sensor. The acoustic air data sensor can be configured to determine a third altitude parameter of the third air data parameter outputs based on the fifth static pressure and the sixth static pressure.

The first static pressure sensor, the third static pressure sensor, and the fifth static pressure sensor can be disposed at a first side of the aircraft. The second static pressure sensor, the fourth static pressure sensor, and the sixth static pressure sensor can be disposed at a second side of the aircraft opposite the first side of the aircraft.

The sixth static pressure sensor can be included in the acoustic air data sensor.

Each of the first air data parameter outputs and the second air data parameter outputs can include a same set of air data parameters.

Each of the first air data parameter outputs and the second air data parameter outputs can be provided to consuming systems of the aircraft.

The acoustic air data sensor can include an acoustic transmitter configured to emit the acoustic signals, and a plurality of acoustic receivers configured to sense the acoustic signals emitted by the acoustic transmitter. The acoustic air data sensor can be configured to generate the second air data parameter outputs for the aircraft based on a time of flight of the acoustic signals from the acoustic transmitter to the plurality of acoustic receivers.

The plurality of acoustic receivers can include a first acoustic receiver, a second acoustic receiver, a third acoustic receiver, and a fourth acoustic receiver. An axis extending through the first acoustic receiver and the second acoustic receiver can be orthogonal to an axis extending through the third acoustic receiver and the fourth acoustic receiver.

A method includes emitting, by a first laser air data sensor disposed on an aircraft, first directional light into airflow about an exterior of the aircraft, receiving, by the first laser air data sensor, returns of the emitted first directional light, and generating, by the first laser air data sensor, first air data parameter outputs for the aircraft based on the returns of the emitted first directional light. The method further includes emitting, by an acoustic transmitter of an acoustic air data sensor disposed on the aircraft, acoustic signals into the airflow about the exterior of the aircraft, sensing, by a plurality of acoustic receivers of the acoustic air data sensor, the acoustic signals transmitted by the acoustic transmitter, and generating, by the acoustic air data sensor, second air data parameter outputs for the aircraft based on a time of flight of the acoustic signals from the acoustic transmitter to the plurality of acoustic receivers.

The method of the preceding paragraph can optionally include, additionally and/or alternatively, any one or more of the following features, configurations, operations, and/or additional components:

The method can further include: emitting, by a second laser air data sensor disposed on the aircraft, second directional light into the airflow about the exterior of the aircraft; receiving, by the second laser air data sensor, returns of the emitted second directional light; and generating, by the second laser air data sensor, third air data parameter outputs for the aircraft based on the returns of the emitted second directional light.

The method can further include: sensing, by a plurality of static pressure sensors disposed on the aircraft, static pressure of the airflow about the exterior of the aircraft; receiving, by each of the first laser air data sensor and the acoustic air data sensor, static pressure measurement information from two or more of the plurality of static pressure sensors; and determining, by each of the first laser air data sensor and the acoustic air data sensor, altitude information based on the received static pressure measurement information. Generating the first air data parameter outputs by the first laser air data sensor can include generating the first air data parameter outputs as including the altitude information determined by the first laser air data sensor. Generating the second air data parameter outputs by the acoustic air data sensor can include generating the second air data parameter outputs as including the altitude information determined by the acoustic air data sensor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
 a first laser air data sensor configured to emit first directional light into airflow about an aircraft exterior and to generate first air data parameter outputs for the aircraft based on returns of the emitted first directional light; and
 an acoustic air data sensor configured to:
  emit acoustic signals into the airflow about the aircraft exterior;
  sense the acoustic signals; and
  generate second air data parameter outputs for the aircraft based on the sensed acoustic signals; and
 wherein the first laser air data sensor is a molecular-based laser air data sensor configured to:
  receive the returns of the emitted first directional light scattered by air molecules within the airflow about the aircraft exterior; and
  determine, based on the returns of the emitted first directional light scattered by the air molecules within the airflow, first static pressure of the airflow, first static air temperature of the airflow, first true airspeed of the airflow, and a first relative wind angle of the first laser air data sensor with respect to the airflow.

2. The system of claim 1,
wherein an exterior surface of each of the first laser air data sensor and the acoustic air data sensor is disposed flush with the aircraft exterior.

3. The system of claim 1,
wherein the acoustic air data sensor is electrically coupled to receive the first static pressure of the airflow from the first laser air data sensor; and
wherein the acoustic air data sensor is configured to:
 determine an altitude of the aircraft based on the first static pressure of the airflow received from the first laser air data sensor; and
 generate the second air data parameter outputs as including the determined altitude.

4. The system of claim 3,
wherein the acoustic air data sensor includes a static pressure sensor configured to sense second static pressure of the airflow about the aircraft exterior; and
wherein the acoustic air data sensor is configured to determine the altitude of the aircraft based on the first static pressure of the airflow received from the first laser air data sensor and the second static pressure of the airflow sensed by the static pressure sensor.

5. The system of claim 1, further comprising:
a first static pressure sensor configured to sense first static pressure of the airflow about the aircraft exterior; and
a second static pressure sensor configured to sense second static pressure of the airflow about the aircraft exterior;
wherein the acoustic air data sensor is electrically coupled to receive the first static pressure from the first static pressure sensor and to receive the second static pressure from the second static pressure sensor; and
wherein the acoustic air data sensor is configured to determine altitude of the aircraft based on the first static pressure and the second static pressure.

6. The system of claim 5,
wherein the first static pressure sensor is disposed at a first side of the aircraft; and
wherein the second static pressure sensor is disposed at a second side of the aircraft, opposite the first side of the aircraft.

7. The system of claim 1, further comprising:
a second laser air data sensor configured to emit second directional light into the airflow about the aircraft exterior and to generate third air data parameter outputs for the aircraft based on returns of the emitted second directional light.

8. The system of claim 7,
wherein the second laser air data sensor is a molecular-based laser air data sensor configured to:
 receive the returns of the emitted second directional light scattered by air molecules within the airflow about the aircraft exterior; and
 determine, based on the returns of the emitted second directional light scattered by the air molecules within the airflow about the aircraft exterior, second static pressure of the airflow, second static air temperature of the airflow, second true airspeed of the airflow, and a second relative wind angle of the second laser air data sensor with respect to the airflow.

9. The system of claim 7, further comprising:
a first static pressure sensor configured to sense a first static pressure of the airflow about the aircraft exterior;

a second static pressure sensor configured to sense a second static pressure of the airflow about the aircraft exterior;
a third static pressure sensor configured to sense a third static pressure of the airflow about the aircraft exterior;
a fourth static pressure sensor configured to sense a fourth static pressure of the airflow about the aircraft exterior;
a fifth static pressure sensor configured to sense a fifth static pressure of the airflow about the aircraft exterior; and
a sixth static pressure sensor configured to sense a sixth static pressure of the airflow about the aircraft exterior.

10. The system of claim 9,
wherein the first laser air data sensor is electrically connected to receive the first static pressure from the first static pressure sensor and the second static pressure from the second static pressure sensor;
wherein the first laser air data sensor is configured to determine a first altitude parameter of the first air data parameter outputs based on the first static pressure and the second static pressure;
wherein the second laser air data sensor is electrically connected to receive the third static pressure from the third static pressure sensor and the fourth static pressure from the fourth static pressure sensor;
wherein the second laser air data sensor is configured to determine a second altitude parameter of the second air data parameter outputs based on the third static pressure and the fourth static pressure;
wherein the acoustic air data sensor is electrically connected to receive the fifth static pressure from the fifth static pressure sensor and the sixth static pressure from the sixth static pressure sensor; and
wherein the acoustic air data sensor is configured to determine a third altitude parameter of the third air data parameter outputs based on the fifth static pressure and the sixth static pressure.

11. The system of claim 9,
wherein the first static pressure sensor, the third static pressure sensor, and the fifth static pressure sensor are disposed at a first side of the aircraft; and
wherein the second static pressure sensor, the fourth static pressure sensor, and the sixth static pressure sensor are disposed at a second side of the aircraft opposite the first side of the aircraft.

12. The system of claim 9,
wherein the sixth static pressure sensor is included in the acoustic air data sensor.

13. The system of claim 1,
wherein each of the first air data parameter outputs and the second air data parameter outputs comprise a same set of air data parameters.

14. The system of claim 1,
wherein each of the first air data parameter outputs and the second air data parameter outputs are provided to consuming systems of the aircraft.

15. The system of claim 1,
wherein the acoustic air data sensor comprises:
an acoustic transmitter configured to emit the acoustic signals; and
a plurality of acoustic receivers configured to sense the acoustic signals emitted by the acoustic transmitter; and
wherein the acoustic air data sensor is configured to generate the second air data parameter outputs for the aircraft based on a time of flight of the acoustic signals from the acoustic transmitter to the plurality of acoustic receivers.

16. The system of claim 15,
wherein the plurality of acoustic receivers comprise:
a first acoustic receiver;
a second acoustic receiver;
a third acoustic receiver; and
a fourth acoustic receiver; and
wherein an axis extending through the first acoustic receiver and the second acoustic receiver is orthogonal to an axis extending through the third acoustic receiver and the fourth acoustic receiver.

17. A method comprising:
emitting, by a first laser air data sensor disposed on an aircraft, first directional light into airflow about an exterior of the aircraft;
receiving, by the first laser air data sensor, returns of the emitted first directional light;
generating, by the first laser air data sensor, first air data parameter outputs for the aircraft based on the returns of the emitted first directional light;
emitting, by an acoustic transmitter of an acoustic air data sensor disposed on the aircraft, acoustic signals into the airflow about the exterior of the aircraft;
sensing, by a plurality of acoustic receivers of the acoustic air data sensor, the acoustic signals transmitted by the acoustic transmitter; and
generating, by the acoustic air data sensor, second air data parameter outputs for the aircraft based on a time of flight of the acoustic signals from the acoustic transmitter to the plurality of acoustic receivers.

18. The method of claim 17, further comprising:
emitting, by a second laser air data sensor disposed on the aircraft, second directional light into the airflow about the exterior of the aircraft;
receiving, by the second laser air data sensor, returns of the emitted second directional light; and
generating, by the second laser air data sensor, third air data parameter outputs for the aircraft based on the returns of the emitted second directional light.

19. The method of claim 17, further comprising:
sensing, by a plurality of static pressure sensors disposed on the aircraft, static pressure of the airflow about the exterior of the aircraft;
receiving, by each of the first laser air data sensor and the acoustic air data sensor, static pressure measurement information from two or more of the plurality of static pressure sensors; and
determining, by each of the first laser air data sensor and the acoustic air data sensor, altitude information based on the received static pressure measurement information;
wherein generating the first air data parameter outputs by the first laser air data sensor comprises generating the first air data parameter outputs as including the altitude information determined by the first laser air data sensor; and
wherein generating the second air data parameter outputs by the acoustic air data sensor comprises generating the second air data parameter outputs as including the altitude information determined by the acoustic air data sensor.

20. A system comprising:
a first laser air data sensor configured to emit first directional light into airflow about an aircraft exterior and to generate first air data parameter outputs for the aircraft based on returns of the emitted first directional light;
a second laser air data sensor configured to emit second directional light into the airflow about the aircraft exterior and to generate third air data parameter outputs for the aircraft based on returns of the emitted second directional light; and
an acoustic air data sensor configured to:
  emit acoustic signals into the airflow about the aircraft exterior;
  sense the acoustic signals; and
  generate second air data parameter outputs for the aircraft based on the sensed acoustic signals.

\* \* \* \* \*